Jan. 15, 1957　　　　G. E. LUPPOLD, JR　　　　2,777,457
FLUID PRESSURE CHARACTERIZING RELAY
Filed June 21, 1951　　　　　　　　　　　　　4 Sheets-Sheet 1

INVENTOR.
GEORGE E. LUPPOLD JR
BY
Raymond W. Junkins
ATTORNEY

Jan. 15, 1957  G. E. LUPPOLD, JR  2,777,457
FLUID PRESSURE CHARACTERIZING RELAY
Filed June 21, 1951  4 Sheets-Sheet 2

INVENTOR.
GEORGE E. LUPPOLD JR.
BY
ATTORNEY

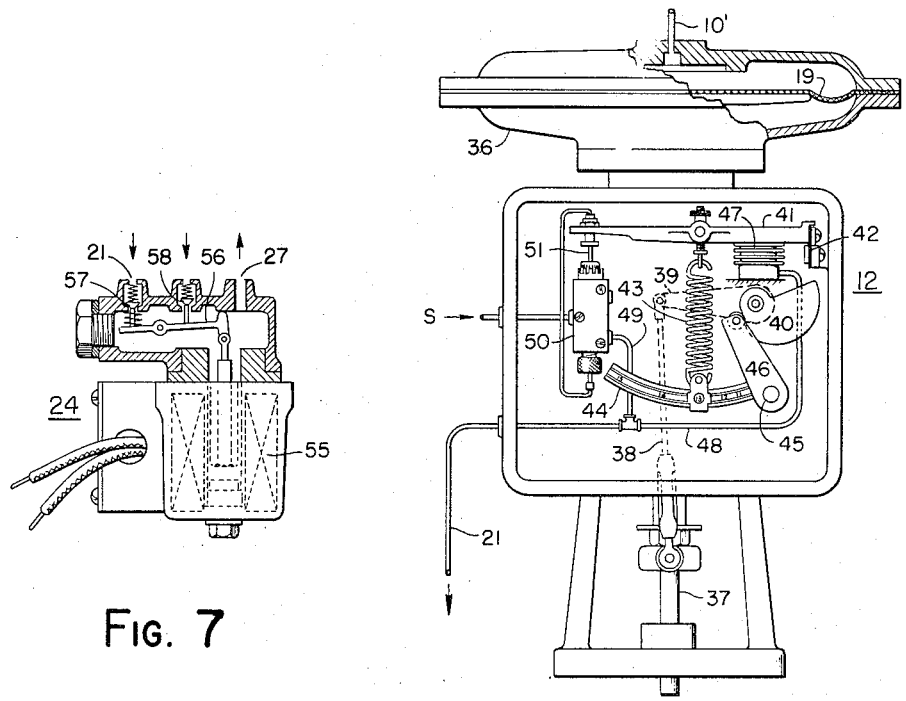
Fig. 5
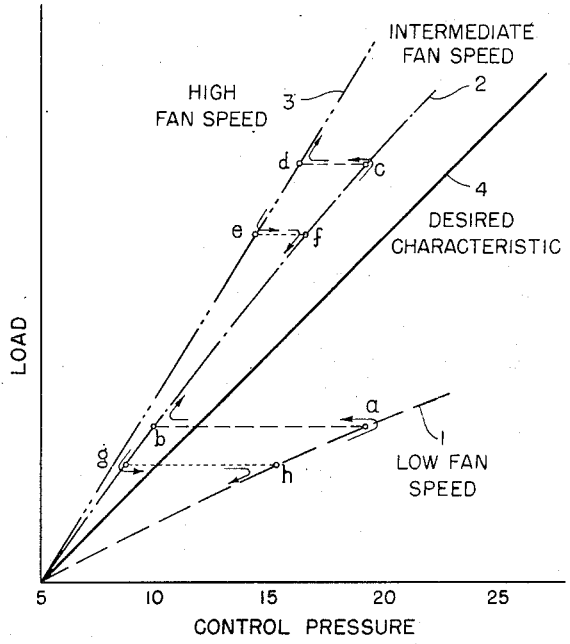
Fig. 7
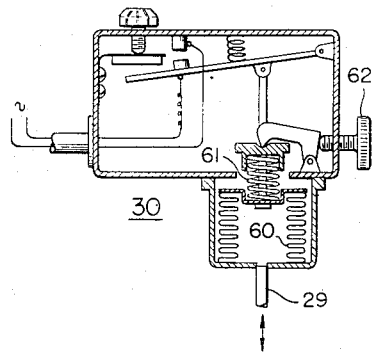
Fig. 8
Fig. 4
INVENTOR.
GEORGE E. LUPPOLD JR.

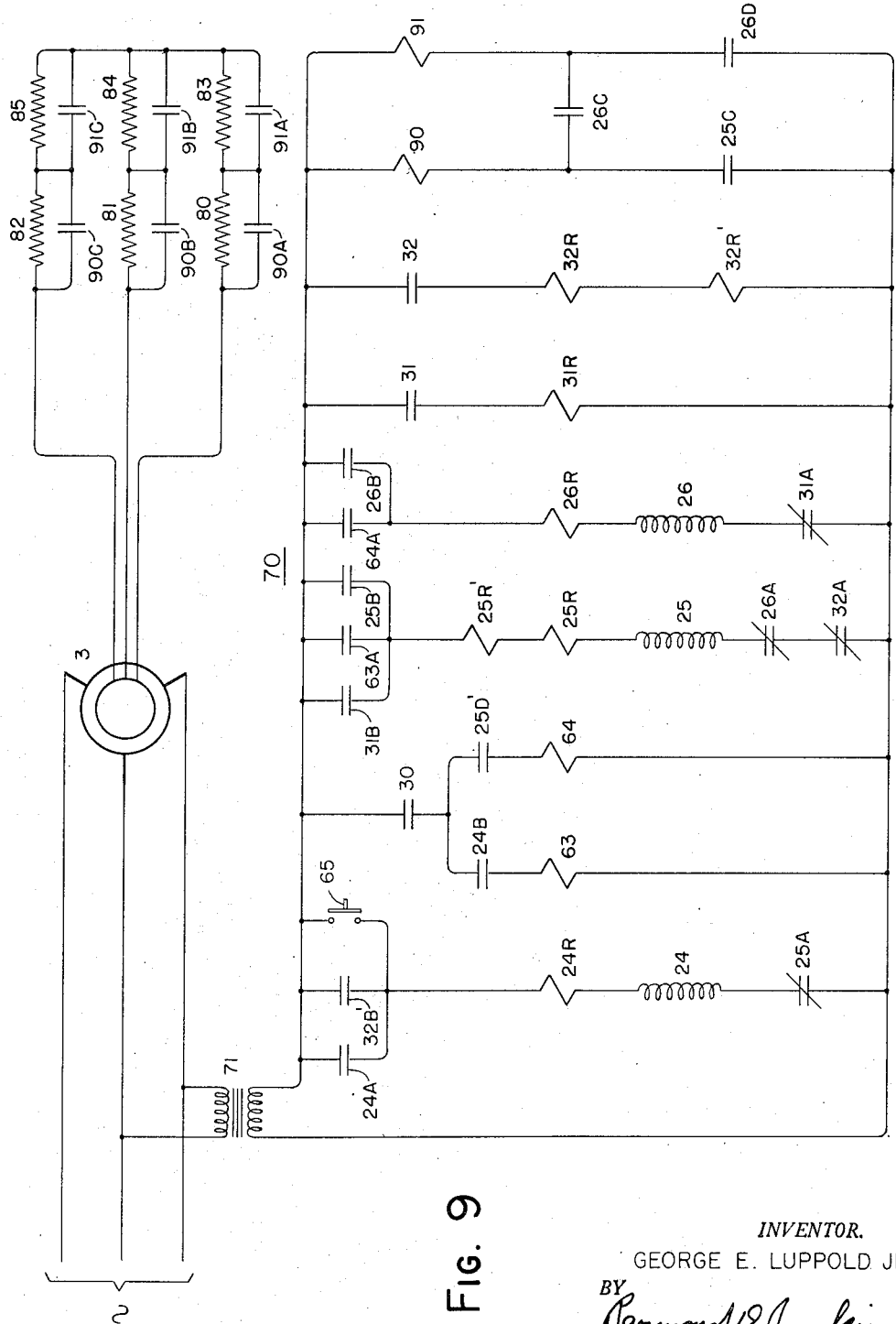

United States Patent Office 2,777,457
Patented Jan. 15, 1957

2,777,457
FLUID PRESSURE CHARACTERIZING RELAY

George E. Luppold, Jr., Altadena, Calif., assignor to Bailey Meter Company, a corporation of Delaware Application June 21, 1951, Serial No. 232,835

1 Claim. (Cl. 137—85)

This invention relates to fluid pressure measuring, telemetering, and control systems; and particularly to systems wherein one or more of the variable conditions have characteristics other than linear, with the desirability of straightening out such characteristics or interrelating them.

Fuid pressure systems are known wherein a fluid loading pressure may be established representative of a variable and the fluid loading pressure then made available, locally or remotely, for measuring and/or controlling one or more variables. The controlled variable may be the same one that produced the loading pressure or may be a different one.

The variable may be the value of a condition, quantity, or position in space of an object, while the condition may be such as temperature, pressure, fluid level, rate of flow, or the like.

One object of my invention is to provide an improved characterizing relay, receptive of a fluid loading pressure, and producing a resultant fluid pressure bearing a desirable functional relation to the fluid loading pressure.

A further object is to provide a fluid pressure measuring, telemetering, or control system including my improved characterizing relays to coordinate variables of the same or different basic characteristics.

Additional objects will become evident upon a study of the annexed drawings, specifications and claim constituting a disclosure of my invention.

In the drawings:

Fig. 2, 3 and 4 are explanatory curves of characteristics and values.

Fig. 5 is a partially sectioned elevation of one of the elements of Fig. 1, particularly a characterizing relay.

Figure 1:
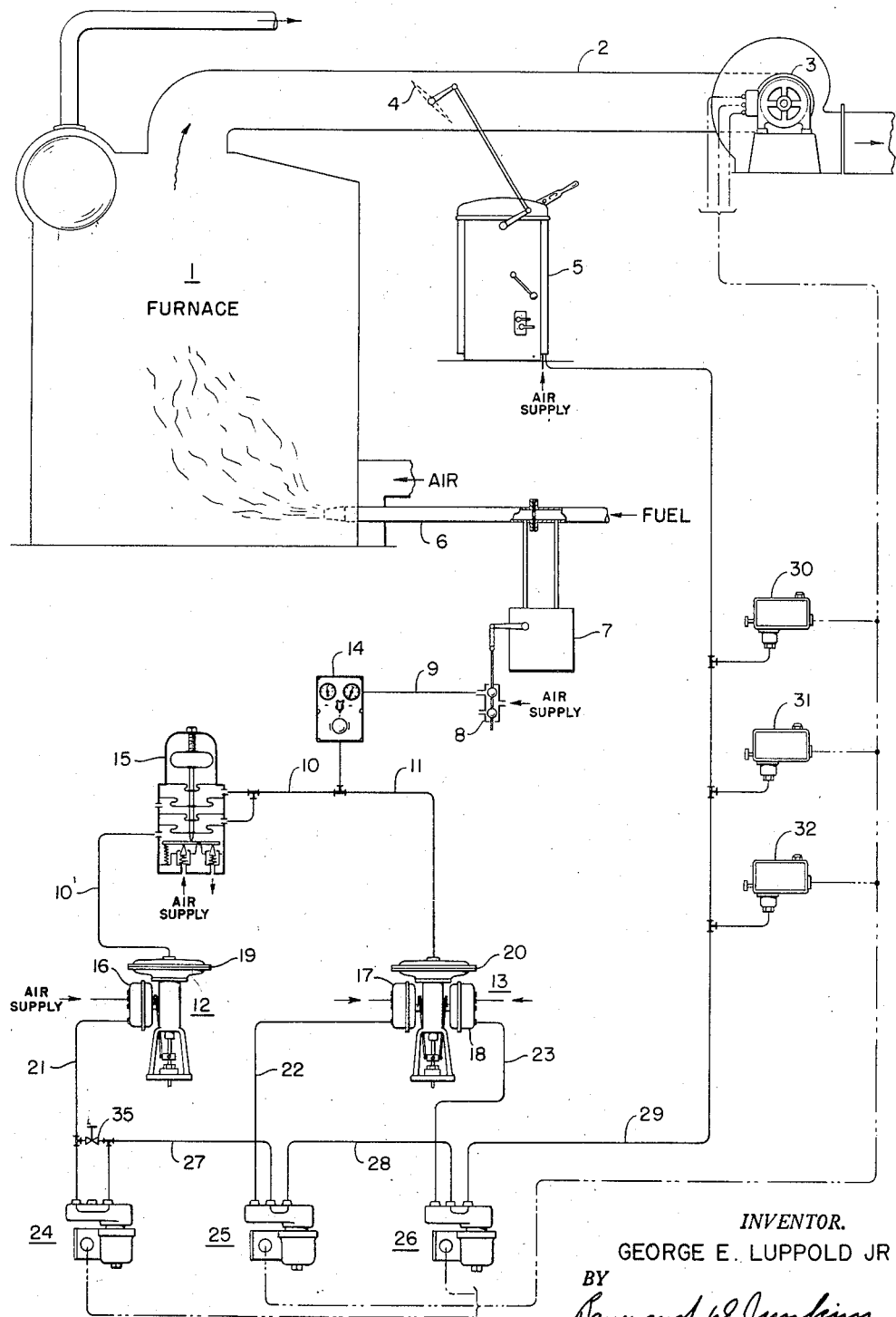
Fig. 1 is a diagrammatic showing of my invention applied to the combustion control of a furnace.

Fig. 7 diagrammatically illustrates a 3-way solenoid valve of Fig. 1.

Fig. 8 diagrammatically illustrates a pressure switch of Fig. 1.

Fig. 9 diagrammatically illustrates a circuit for interconnecting the fluid pressure system to the fan speed control system.

Referring now to Fig. 1, I diagrammatically indicate a combustion furnace 1 to which are supplied fuel and air, and from which the products of combustion are exhausted by means of an induced draft fan. Specifically, the induced draft fan and damper are controlled in accordance with a demand index which in this case is represented by fuel supply rate to the combustion process. It is realized that other indexes of demand may be used, such as steam flow from a vapor generator heated by the furnace, or steam pressure, or the like. For purposes of the present discussion I have shown fuel flow rate as the demand index controlling the induced draft fan and damper.

The conditions in connection with the induced draft fan and damper may in fact exist in substantial duplication in forced draft fan and damper apparatus, so that it appears unnecessary herein to illustrate and describe such substantial duplication.

It will be realized that fuel and air flows discussed in this preferred embodiment are representative only of two conditions which may be controlled or used in my invention and do not serve to limit my invention.

In Fig. 1 I indicate the furnace 1 as having an uptake or stack duct 2 to which is connected a fan driven by a motor 3. The damper 4 is located in the duct 2 and may be positioned by a power device 5 in accordance with the dictates of the system. In the particular embodiment being described the fan 3 is what is known as a 3-speed fan and the over-all operation is desirably to throttle the damper 4 over its operating range for each of the operating speeds of the fan. In other words, at each of the three fan speeds, it is desirable to have some throttling control over the damper or otherwise there would be merely three basic rates of operation of the system rather than an integrated and modulated control throughout the operable range of the three speeds of the fan. Inasmuch as the characteristics of the three speeds of the fan, and the damper, are not necessarily linear nor are they necessarily of the same slope, it will be appreciated that the control problem is one of properly coordinated different characteristics and to that end my improved characterizer relay and system employing the same is applied to coordinate the characteristics of the different pieces of apparatus.

Figure 2:
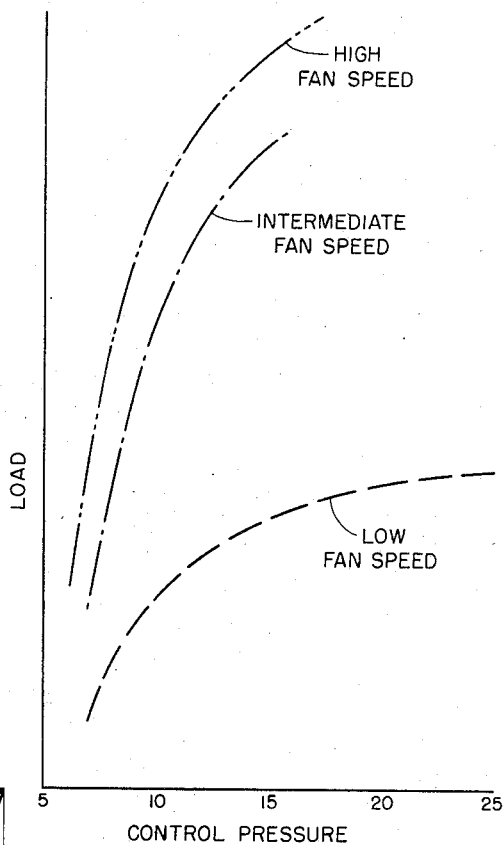

Fig. 2 indicates typical characteristic curves for the three basic fan speeds and it will be observed that these spread apart and are non-linear.

Figure 3:
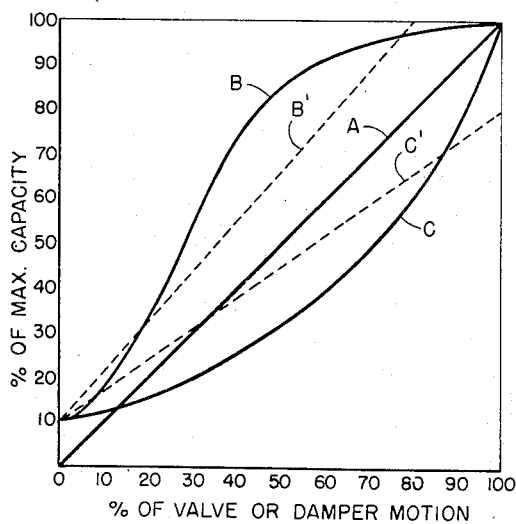

Reference to Fig. 3 shows other characteristics encountered in various control problems and the graphs of Fig. 3 are merely taken as representative for purposes of discussion and illustration. I have plotted here percent of valve or damper motion against percent of maximum capacity and it will be observed that the line A is the ideal response characteristic from 0 to 100% capacity change for full valve or damper travel. If I could assume that the flow versus motion characteristic of a control valve or of a control damper were a straight line, such as A of Fig. 3, there would be no great problem in lining up the various elements of a control system and coordinating the different effects of movement or position thereof.

However, I know from experience that the characteristic curve of a damper 4 may be somewhat like curve B of Fig. 3, while a control valve may have a characteristic like C. From these curves it will be seen that a 10% change in valve position from 80% to 90% means a change in flow of about 17%, while a similar change in damper position means a flow change of about 3%; a 10% change of valve position from 20% to 30% means a change in flow of about 5%, while a similar change in damper position means a flow change of about 24%. This even on the basis of the maximum capacities of the valve and damper being similar in terms of flow, a condition which rarely is obtained.

The shape of the curve B or C may depend upon the shape and number of valve ports, damper louvres, or other variables of design. Furthermore it is frequently found that where a valve or damper is in what is presumed to be a shut-off position there may be as much as 10 or 15% leakage past the seat. Thus, curves B and C have been shown, by way of example, as starting at 10% leakage flow but ending together at the same maximum flow.

In designing a process and applying commercial apparatus thereto, it is rather infrequent that exactly the same desired maximum rate of fluid flow through the valve (or damper) is reached at exactly maximum opening position. Frequently the maximum flow capacity of the valve (or damper) falls short or exceeds the desired maximum. Thus the damper curve B (assuming it for the moment to be linear) might take the position B', starting with 10% leakage and reaching maximum flow at 80% motion, while curve C (assumed to be linear) might take the position C', never reaching more than 80% of desired flow for full valve opening. Thus the mere fact that output curves B' and C' are linear does not mean that they may be desirably correlated for, even though they started at the same point, they end at different capacity figures for a given motion.

It is therefore a particular feature of my present invention to provide characterizer means not only for straightening out non-linear characteristic curves but to provide the possibility of correlation between such curves whether linear or non-linear.

In general, Fig. 4 illustrates a desirable result of the curves of Fig. 2 through the application of the system of Fig. 1 of the features of my present invention. Here, as in Fig. 2, I have plotted control pressure against load and indicate by curve 4 the desired characteristic of the combined fan and damper.

The system for control of the damper 4 (Fig. 1) in connection with the 3-speed fan motor 3, is a fluid pressure system in which the control of the damper 4 is generally in accordance with an index of demand for which I have chosen the rate of fuel supply through the pipe 6 as sensed by a rate meter 7 arranged to position the movable element of a pilot valve 8 to continuously establish in a pipe 9 a fluid loading pressure representative of the demand index. The supply pipe 9 splits as at 10, 11 with the branch 10 joining a characterizer relay 12, while the branch 11 joins the characterizer relay 13.

Interposed between the pipe 9 and the pipes 10, 11 is a manual-automatic selector valve 14 of known type. The pilot valve 8 may be similar to that disclosed in the Johnson Patent 2,054,464, and the selector valve 14 like that of the patent to Fitch 2,202,485. Interposed in the pipe 10 is a relay 15 which may be of the type disclosed in Gorrie Re. 21,804 for calibrating or doubling the effect of the loading pressure in pipe 10 upon the diaphragm of characterizer 12, relative to the pressure effective upon characterizer 13.

The characterizer 12 is like that shown to enlarged scale in Fig. 5 and has a device 16 which will be explained in connection with Fig. 5. Characterizer 13 has two devices 17, 18 which are similar to device 16. Thus the assembly of Fig. 5 may be explained in connection with both characterizers 12 and 13. In Fig. 1 then, the fluid pressure impulse from relay 15 positions a diaphragm 19 of the characterizer 12 to establish in the output pipe 21 thereof a resultant fluid pressure which, under certain conditions, is effective in positioning the control drive mechanism 5. Similarly the fluid loading pressure available in pipe 11 is effective upon the diaphragm 20 to simultaneously position or actuate the mechanisms 17, 18 to establish in the pipes 22, 23 separate resultant fluid pressures which under certain conditions are also effective in actuating the control drive 5. It may be said in general that the devices 16, 17 and 18 are related to the three speeds of the fan motor 3 and become individually effective in control of the drive mechanism 5 depending upon which of the three speeds the fan motor is operating.

I would point out now that the characterizers 12 and 13 function to receive a fluid loading pressure and to provide a resultant fluid pressure bearing a desired relation to the incoming fluid loading pressure. Thus the characterizers constitute means for characterizing fluid loading pressures between their source and their point of application. Such characterizing relays in fluid pressure control systems I believe to be new and novel. In the present embodiment they serve to correlate the different characteristic values of damper operation under each of the three fan speeds encountered. The result is a unified control system for properly positioning the damper 4 irrespective of which motor speed the fan is operating on and in accordance with the demand as represented by the index fuel supply rate.

My invention matches a specific characterizer of predetermined function with a predetermined fan speed in accordance with the demand upon the furnace 1 as represented by fuel flow rate through pipe 6. This selection sequence is accomplished dependent upon the fan speed operation to satisfy wide and rapid fluctuations in demand.

As these fan speeds are used as illustrative of relative levels of potential here, they can be designated low, intermediate and high. Therefore, rapid and frequent load changes over ranges requiring the use of low, intermediate and high speed operation of the draft fan may render it desirable to have these changes initiated automatically to maintain the desired fuel-air ratio as closely as possible at all times. My control system meets such requirements automatically and efficiently with a basically simple structure requiring a minimum of maintenance.

Assuming now that operation is on the low fan speed and with an increasing load. A solenoid actuated valve 24 is energized while solenoid actuated valves 25 and 26 remain deenergized. This is accomplished through a tie-in with the electrical control system of the fan motor 3. The fluid loading pressure in pipe 10' is applied to the diaphragm 19 and the device 16 establishes a resultant loading pressure in the pipe 21 as required for low speed fan operation. This loading pressure from pipe 21 is available in pipes 27, 28 and 29 and effective in positioning the control drive 5 and thereby the damper 4 along a resultant curve 1 of Fig. 4 which shows the interrelation between control pressure and load throughout the operating range of the low fan speed. As the control pressure in pipes 21, 27, 28 and 29 increases along curve 1 it eventually arrives at location $a$, near the maximum capability of low fan speed operation, and a fluid pressure actuated electric contact switch 30, sensitive to pressure within the pipe 29, makes contact to initiate electrical transfer of the fan motor from low speed to intermediate fan speed. This electrical transfer actuates solenoid valve 25 and causes the deenergization of solenoid 24. Thus the pressure in 27 no longer may pass through the passages of solenoid valve 25 but the pressure in pipe 22 becomes effective in pipes 28 and 29 and upon the control drive 5 to position the damper 4 along curve 2 (Fig. 4) corresponding to intermediate fan speed.

The electrical network needed to insure that the motor control circuit will activate the proper 3-way solenoid valve and which is properly responsive to the pressure switches sensitive to pressure within the pipe 29 is shown in Fig. 9 and forms no part of my invention. My invention is concerned with the activation of this electrical network by means of the pressure switches 30, 31 and 32 and the utilization of impulses from the electrical network in activating the solenoid valves 24, 25 and 26.

Operation of the control drive 5 has now been shifted from curve 1 to curve 2 along the line $a$—$b$ and an increase in demand will indicate an upward movement along curve 2 until some location $c$, near the upper limit of the intermediate fan speed operation, is reached. The fan speed change cycle is again initiated by pressure switch 30 at point $c$ which transfers operation along the line $c$—$d$ and, upon an increase in demand, upward along curve 3 to maximum capacity at the highest fan speed.

On decreasing load variation of control pressure to the control drive 5 is downward along curve 3 until point $e$ is reached representing operation sufficiently below the maximum capabilities of intermediate fan speed operation to allow reducing the fan speed. Pressure switch 31 actuates the electrical circuit to which I have heretofore referred so that the high speed circuit is deenergized and the intermediate speed circuit is energized. This in turn deenergizes the solenoid valve 26 and energizes solenoid valve 25. Loading pressure from the device 17 is again transmitted to the control drive 5 and operation of the drive is now along curve 2.

The change from intermediate to low fan speed is similar in taking place at the point g on curve 2 which is sufficiently below the maximum operating capabilities of low fan speed operation to prevent the possibility of immediately switching back to the intermediate speed. However, since the fan will require some time to slow down to speed corresponding to low speed operation, suitable time delay relays are to be incorporated in the electrical circuit to prevent energizing the low speed circuit before a given time has elapsed. During this time period none of the solenoid valves are energized; the loading pressure established by position transmitter 16 being transmitted to the control drive 5 through a bleed valve 35. This bleeding of pressure to the damper control drive allows it to gradually assume position h the speed at which the change is made being dependent upon the setting of bleed valve 35. When the low speed circuit is finally energized by pressure switch 32, solenoid valve 24 is in turn energized from the motor circuit and the bleed valve 35 is by-passed permitting operation again along curve 1.

It will thus be seen that the fan motor speed characteristic curves of Fig. 2 are straightened out to approximate curves 1, 2 and 3 of Fig. 4, through the agency of the characterizers 12 and 13. The operation of the complete system of Fig. 1 sequentially ties the activation of control drive 5 and damper 4 to the proper one of the three fan motor speeds. The electrical network forms no part of the present invention and serves only to insure that the proper solenoid valve and pressure switch are activated to agree with the fan speed at which the motor is operating. The result is that the curves of Fig. 2 are straightened out to form the curves 1, 2 and 3 of Fig. 4 and that automatic transfer of operation between the curves 1, 2 and 3 is at predetermined points on the curves and preferably the transfer (going up) is made at a different point than coming down so that there will be no tendency to transfer back and forth at a given load rating. Adjustabilities are provided in the various mechanisms so that the operation may be adjusted on the job to meet peculiarities of the particular installation.

Fig. 9 is a circuit diagram of the interconnection between solenoids 24, 25 and 26, pressure switches 30, 31, and 32, and a fan motor 3. Fan motor 3 is a three speed, three phase, wound rotor, induction motor wherein the speed is varied by cutting in and out resistances 80—85 through the actuation of contacts 90A—B—C, 91A—B—C by relays 90 and 91 in the operation of circuit 70 as described below. Motor 3 is shown powered by a three phase alternating current supply with a transformer 71 to energize circuit 70.

When the motor 3 is initially energized it operates on low speed as resistances 80—85 are effective in the rotor circuit of motor 3.

Circuit 70 is initially energized by depressing push button 65 which energizes solenoid 24 and auxiliary relay 24R. With solenoid 24 energized, damper 4 of Fig. 1 is positioned by control drive 5 in accordance with the fluid loading pressure in pipes 27, 28 and 29 as established by characterizer 16. The energization of auxiliary relay 24R causes contacts 24A, 24B to close, with contact 24A acting as a holding contact so that the energization of relay 24R and solenoid 24 is maintained when push button 65 is released.

The control system will operate under the above circumstances until the loading pressure in pipe 29 increases to the point a shown on line 1 in Fig. 4. At point a, pressure switch 30 is closed by the increased loading pressure and since contact 24B of circuit 70 is already closed, auxiliary relay 63 will be energized to close contact 63A.

The closing of contact 63A causes the energization of auxiliary relay 25R, time delay relay 25R', and solenoid 25. The relay 25R operates to open contact 25A to deenergize solenoid 24 and relay 24R, thus opening contact 24A and 24B, thereby deenergizing auxiliary relay 63 which opens contact 63A. Contact 25B has been closed by the energization of auxiliary relay 25R to hold solenoid 25 energized. Contact 25C also closes when relay 25R is energized which energizes relay 90 to close contacts 90A—B—C thus cutting out resistances 80—82 putting the fan motor 3 on intermediate speed operation.

Relay 25R' is a time delay relay (on closing only) utilized in circuit 70 to prevent the immediate closing of contact 25D', which if closed immediately might actuate motor 3 to operate at high speed. Rather time delay relay 25R' allows sufficient time for the pressure to drop in line 29 to deactuate pressure switch 30, so that pressure switch 30 is open as the control pressure follows line a—b of Fig. 4.

When the control pressure in line 29 increases to point c from point b along line 2 of Fig. 4, pressure switch 30 is again closed. Contact 25D' has by this time been closed by the action of the time delay relay 25R' thus allowing auxiliary relay 64 to be energized. Relay 64 closes 64A which allows auxiliary relay 26R and solenoid 26 to be energized. Relay 26R also opens contact 26A, which deenergizes solenoid 25 and relay 25R and time delay relay 25R'. Solenoid 26 remains energized as contact 26B was closed by the energization of relay 26R. Also contacts 26C and 26D are closed which energizes relays 90 and 91 of the motor circuit thus cutting out resistances 80—85 and causing the motor to operate at high speed. At the same time the damper 4 is being controlled by fluid pressure in pipe line 29 through characterizer 18.

When the loading pressure in line 29 decreases along line 3 to point e in Fig. 4, pressure switch 31 is closed to energize auxiliary relay 31R. This opens contact 31A which deenergizes solenoid 26 and closes contact 31B to energize solenoid 25. Thus contacts 26C and 26D have been opened and contact 25C is closed, thus closing contacts 90A—B—C to cut out resistances 80—82 causing the motor to operate at intermediate speed, and the damper 4 is being controlled by a fluid pressure through solenoid valve 25.

With a decreasing fluid pressure from point f along line 2, of Fig. 4, pressure switch 31 opens and pressure switch 32 is closed. This energizes auxiliary relay 32R which opens contact 32A allowing solenoid 25 to deenergize. Additionally, time delay 32R' is energized, but does not immediately close contact 32B' until the fan speed has been sufficiently reduced. During this period all solenoids 24, 25 and 26 are deenergized and the loading pressure in pipe line 29 is controlled by bleed valve 35 of Fig. 1. After a certain time, time delay relay 32R' allows 32B' to close thus energizing solenoid 24, putting the loading pressure under control of characterizer 16, and bleed valve 35 is closed. As relay 25R was deenergized, contact 25C was opened and the fan operates at low speed and damper 4 is controlled, as described above, by characterizer 16.

Referring now to Fig. 5 I disclose therein in somewhat diagrammatic arrangement the cooperation of the components of the diaphragm operators and the devices of Fig. 1, constituting what I term a characterizer 12 or 13.

The characterizer 12, as shown in Fig. 5, is a unitary mechanism inserted between the incoming conduit pipe 10' and the outgoing pipe 21 to characterize the fluid loading pressure signal existing in the pipe 10'. This device is similar to that disclosed in Gorrie et al. 2,679,-829. Thus intermediate the pipes 10' and 21 I provide a mechanism which may change the character of the fluid loading pressure from linear relation to functional relation, or vice versa, or as may be desired. Examples of the possibility of use of such a characterizer, in addition to those specifically used in Fig. 1, will be explained hereinafter.

The diaphragm 19, to the top surface of which is impressed the fluid loading pressure within the pipe 10', is housed in a casing 36 and forms two chambers therein. The lower chamber, below the diaphragm 19, may be open to the atmosphere as, in this particular embodiment, it is not used to contain a working fluid pressure. Positioned by and with the diaphragm 19 is a movable member 37 and the force of the fluid loading pressure from pipe 10', acting in one direction upon the diaphragm 19 and member 37, is opposed by a spring (not shown). Thus the member 37 assumes a position representative of the value of the fluid loading pressure within the pipe 10' at all times. Motion of the member 37 is transmitted through a pivoted arm 38 to angularly move an arm 39. Angular movement of the arm 39 in turn angularly positions a cam 40 which may be shaped to perform the desired characterization.

A force-balance beam 41, pivoted as at 42, receives two opposing forces. One of the forces is that of a spring 43 having its upper end adjustably fastened to the beam 41 and its lower end adjustably fastened to an arm 44 of a bell crank operable around a center 45 and having a second arm 46 whose roller end engages the periphery of cam 40. For any given position of the beam 41 an angular movement of the cam 40 causes a positioning of the bell crank 46, 44 around its center 45, to load or unload the spring 43 acting upon the beam 41. Thus any movement of the cam 40 effects the spring loading of beam 41. Inasmuch as movement of the cam 40 results from a positioning of the rod 37 through the agency of diaphragm 19, it will be apparent that the spring loading of beam 41 is related to the fluid loading pressure in pipe 10' through the intermediary of the characterizing cam 40.

Adjustability for initial loading as well as range of loading, of the spring 43, is provided at the points of connection of the spring 43 with the beam 41 and with the arm 44.

The opposing loading of the beam 41 is through a bellows or other expansible chamber member 47 receiving fluid pressure from a pipe 48 which, with the pipe 21, joints the outlet 49 of a pilot valve 50 whose movable stem 51 is carried by and with the beam 41.

Preferably clean, compressed air at a pressure of approximately 28 p. s. i. g. is available at S to the pilot valve 50. The operation of the pilot assembly 50, 51 is such that as the stem 51 is moved downwardly the pressure at the outlet 49 is increased. Thus, if the loading of the spring 43 is increased, tending to pull the beam 41 in counterclockwise direction and lower the member 51, the pressure within pipe 49 is increased and this pressure, effective through the pipe 48 upon the bellows 47, acts separately upon beam 41 to overcome the increased loading of the spring 43 and return the beam to a balanced condition. Thus the pressure at outlet 49 is a resultant of the pressure in pipe 10' and the cam effect of cam 40 upon spring 43. If the profile of cam 40 is of uniform rise, and the air loading pressure in pipe 10' is linear, the result will be that the pressure within outlet 49 and pipes 48, 21 will be linear. It will be apparent that the cam 40 may be so shaped that the relation between the pressures within pipes 10' and 21 may be quadratic in function or of a non-uniform functional relation as desired. For example, it will be seen that the curves of Fig. 2 may be characterized to result in the straight line curves 1, 2 and 3 of Fig. 4. Assuming uniform increments of control pressures available at pipe 10' then, through the characterization of cam 40, the output pressures in pipe 21 may satisfactorily characterize or straighten out curved relationships or, on the other hand, if the pressure range in pipe 10' is non-linear then the characterization may result in a linear relation in pipe 21. Another way of expressing the relation between input and output fluid pressures and the cam is to say that cam 40 is given a configuration complemental to the specific non-linear variation of one pressure with the other pressure variation linear.

Figure 6:
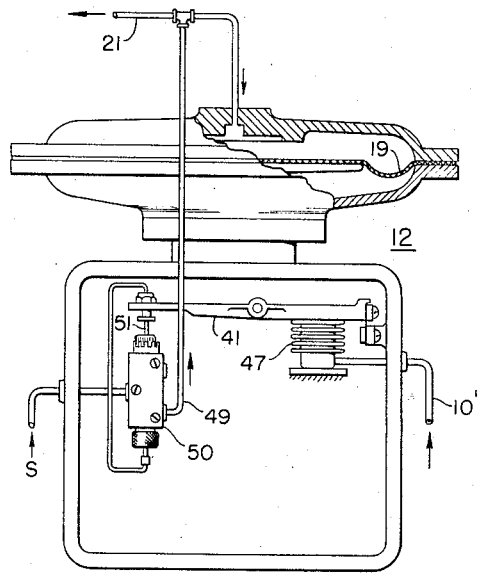
Fig. 6 is another characterizing relay.

Referring now to Fig. 6 I show a portion of the characterizer of Fig. 5 to explain another way if piping up the same which may, in certain instances, be desirable. Similar elements of Figs. 5 and 6 bear the same reference numerals and certain unchanged parts of Fig. 5 have not been incorporated in Fig. 6.

It will be seen in Fig. 6 that the only change from Fig. 5 is the way the piping of the loading pressures is effected. Incoming fluid loading pressure from pipe 10' is applied (in Fig. 6) directly to the interior of bellows 47. Thus it acts directly upon the beam 41 in opposition to the spring 43 whose loading is representative of the characterizing cam shape. If the incoming loading pressure in pipe 10' does not balance the loading of spring 43 representative of cam position and shape 40, then the beam 41 is moved in one direction or the other thus positioning the pilot stem 51 and varying the pressure output within pipe 49. Pressure within pipe 49 is effective upon the upper surface of diaphragm 19 and thus is the motivating force for angular movement of the cam 40. In this embodiment the beam 41 is a force balance for the loading pressure in pipe 10' and for the spring 43 under the control of characterizing cam 40. Unbalance of the beam varies the fluid output pressure acting upon the upper surface of diaphragm 19 to effect a movement of cam 40 and loading or unloading of the spring 43 until a balance of force beam 41 is restored. Thus, here again, the loading pressure 10' is modified or affected by the cam shape 40 to produce an output loading pressure in pipe 21 characterized relative to that available in pipe 10'.

There is some advantage in the arrangement of Fig. 6, over that of Fig. 5, under certain applications. Applying the incoming pressure from pipe 10' to the bellows 47 allows the steepest rise on the cam, in square root extraction, to fall on the last half of the cam surface. With the cam so shaped it may be turned over for those diaphragm operators moving in the opposite direction without binding the cam follower on an initial steep rise of cam surface.

I think basically, however, that the arrangement of Figs. 5 and 6 merely shows two possibilities of connection and operation and that the over-all functioning and advantages of the assembly are similar. In either arrangement a fluid pressure signal is characterized by a shaped cam to result in an output fluid pressure bearing desired relation to the incoming fluid pressure. Thus I provide a characterizing fluid pressure relay insertable in any fluid pressure control signal pipe for interrelating linear and non-linear functions, extracting square root, and similar services.

By way of further detailed explanation of the embodiment of Fig. 1 I refer now to Figs. 7 and 8 showing the internal construction of the solenoid actuated valve and of the pressure switch previously referred to. In Fig. 7 I show a partially sectioned elevation of the solenoid valve 24, similar to valves 25, 26. It will be apparent that when the solenoid winding 55 is energized the beam 56 will be moved in a clockwise direction thus opening valve 57 and allowing communication between pipes 21 and 27 and closing off valve 58. Referring to Fig. 1 it will be seen that if valve 24 is energized and valves 25, 26 are deenergized pipe 21 is connected to pipes 27, 28 and 29 while the valves 57 of 25 and 26 remain closed and prevent communication between pipes 22, 23 and 28, 29.

In Fig. 8 I illustrate a somewhat diagrammatic section of the pressure actuated electric switch 30 as representative of switches 30, 31 and 32. A bellows 60 is receptive of pressure within the pipe 29 and is loaded by a spring 61 adjustable as to loading through hand actuated means 62. It will be evident that the assembly may be so adjusted that electric contacts are opened or closed when certain pressure valves in pipe 29 are attained, either upon an increase in pressure or upon a decrease in pressure.

While I have chosen to illustrate and describe my invention in a preferred embodiment wherein a plurality of fluid pressure characterizers are incorporated in a control system to characterize certain relations and correlate them; it will be appreciated that this is by way of example only. I contemplate many other possible systems including my improved characterizer of which I will mention a few.

As examples of the possibilities of my improved characterizer I mention:

1. A characterizing relay for fluid pressure systems receptive of a fluid loading pressure signal, characterizing the loading pressure through predetermined cam design, to produce a resultant fluid pressure bearing desired value relation over a given range to the incoming loading pressure.

2. To establish fluid pressure values for damper or valve characteristics to change the same into linear functions or to match each other.

3. For extracting the quadratic relation between differential pressure across an orifice and fluid rate of flow. Particularly in vapor generator operation for steam outflow and/or air flow.

4. For a fluid loading pressure representative of a demand index to branch through two or more control functions and desirably to be differently characterized to go to the several control functions simultaneously or sequentially.

5. In a system desirably combining two effects where one should be characterized to match or to be interrelated with the other.

I have illustrated and described certain preferred embodiments of my invention but it will be understood that this is not to be considered as limiting.

What I claim as new and desire to secure by Letters Patent of the United States is:

A regulating mechanism comprising, in combination, a first beam pivotally supported at one end, a pilot valve operatively connected to the other end of the first beam, a second beam pivotally supported at one end, a spring connecting the first and second beams, a first fluid pressure responsive device, a first passage to the first fluid pressure responsive device for conducting a fluid pressure with a specific non-linear variation thereto, a connection between the first fluid pressure responsive device and the second beam, said connection having a cam arranged to position the second beam about its pivot and having a configuration complemental to the specific non-linear variation with which to move the second beam with a linear variation against the spring force and thereby the first beam to actuate the pilot valve to establish a linear fluid pressure output, a second fluid pressure responsive device acting upon the first beam for swinging the latter about its pivot against the spring force, a second passage means connecting the pilot valve linear output fluid pressure and the second fluid pressure responsive device, and a third passage connected to the second passage to receive and transmit the linear fluid pressure output of the pilot valve.

References Cited in the file of this patent
UNITED STATES PATENTS

| | | |
|---|---|---|
| 1,333,986 | Lundgaard | Mar. 16, 1920 |
| 1,666,270 | Soderberg | Apr. 17, 1928 |
| 1,668,655 | Morrill | May 8, 1928 |
| 1,972,990 | Hardgrove | Sept. 11, 1934 |
| 2,020,847 | Mitereff | Nov. 12, 1935 |
| 2,185,970 | Ziebolz | Jan. 2, 1940 |
| 2,193,184 | Weaver | Mar. 12, 1940 |
| 2,197,904 | Terry | Apr. 23, 1940 |
| 2,217,518 | Merkt | Oct. 8, 1940 |
| 2,220,176 | Rosenberger | Nov. 5, 1946 |
| 2,379,008 | Klinker | June 26, 1945 |
| 2,388,457 | Ziegler | Nov. 6, 1945 |
| 2,542,260 | Poole et al. | Feb. 20, 1951 |
| 2,612,902 | Ward | Oct. 7, 1952 |
| 2,679,829 | Gorrie et al. | June 1, 1954 |

OTHER REFERENCES

"Solving Control-Valve Pressure Prop Problems," by H. C. McRae, "Instruments," July 1943, vol. 16, page 399.